(No Model.)

D. J. GRONDIN.
EVAPORATOR.

No. 545,071. Patented Aug. 27, 1895.

Witnesses
F. C. Laberge.
Art. Pagé

Dieudonné John Grondin, Inventor
By his Attorney J. A. Marion.

UNITED STATES PATENT OFFICE.

DIEUDONNE JOHN GRONDIN, OF YAMACHICHE, CANADA.

EVAPORATOR.

SPECIFICATION forming part of Letters Patent No. 545,071, dated August 27, 1895.

Application filed May 31, 1895. Serial No. 551,059. (No model.) Patented in Canada May 18, 1894, No. 46,101.

*To all whom it may concern:*

Be it known that I, DIEUDONNE JOHN GRONDIN, a citizen of the Dominion of Canada, residing at Yamachiche, in the county of St. Maurice, Province of Quebec, Canada, have invented certain new and useful Improvements in Evaporators, (patented in Canada May 18, 1894, No. 46,101;) and I do hereby declare the following to be a full, clear, and exact description of the invention, such as will enable others skilled in the art to which it appertains to make and use the same.

This invention relates to evaporators for maple-sap, sorghum, cider, and other similar liquids; and it consists in the novel construction and combination of the parts hereinafter fully described and claimed.

Figure 1:
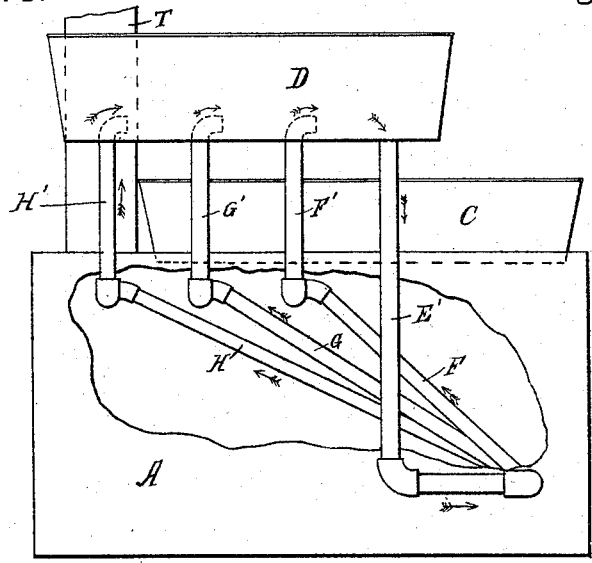
Figure 2:
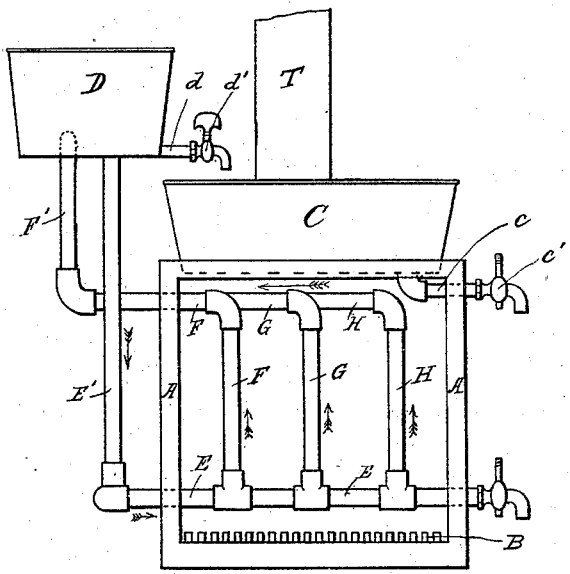

In the drawings, Figure 1 is a side view of the evaporator with a portion of the stove-wall broken away, and Fig. 2 is a front view of the evaporator.

A is a stove or furnace of any approved construction, and B is the grate for the fuel.

T is the chimney for carrying off the smoke.

C is a pan supported at the upper part of the stove above the fire, and provided with a discharge-pipe c, having a regulating-valve c'.

D is a second pan supported at a higher level than the pan C, and provided with a discharge-pipe d, having a regulating-valve d' arranged over the pan C. The pan D is not directly heated by the stove, and may be placed at some little distance from it, if desired.

E is a heating-tube arranged horizontally inside the stove over the fire on the grate, and E' is a branch of the tube E, extending upwardly outside the stove and connecting with the bottom part of the pan D.

F G H are heating-tubes arranged in inclined positions inside the stove and connected to the horizontal tube E.

F' G' H' are branch tubes arranged outside the stove and connecting the respective tubes F G H with the lower part of the pan D. The said branch tubes have curved upper ends inside the pan to prevent the liquid from spurting up in the pan.

The pan D is filled with the liquid to be evaporated. The heat of the fire causes a rapid circulation in the tubes F G H, the liquid passing up the said tubes and down the tube E', as indicated by the arrows. The liquid boils in the pan D, and when partially evaporated and less able to circulate freely it is let out of the pan D into the pan C, in which it is subjected to the direct action of the fire in the stove, and in which the evaporation is completed to the required extent.

What I claim is—

In an evaporator, the combination, with a stove, and a pan C supported directly over the stove; of a second pan D supported at a little distance above the pan C and provided with a valve for delivering its contents into it, the horizontal pipe E arranged inside the stove and connected to the lower part of the pan D, and the inclined pipes F, G, H, connected to the pipe E inside the stove and to the lower part of the pan D, substantially as set forth.

In testimony whereof I affix my signature in presence of two witnesses.

DIEUDONNE JOHN GRONDIN.

Witnesses:
P. J. HÉROUX,
ZÉPHIR BOURONA.